(12) United States Patent
Palumbo et al.

(10) Patent No.: US 9,392,014 B2
(45) Date of Patent: Jul. 12, 2016

(54) AUTOMATED DETECTION OF HARMFUL CONTENT

(71) Applicant: F-Secure Corporation, Helsinki (FI)

(72) Inventors: Paolo Palumbo, Helsinki (FI); Andrew Patel, Helsinki (FI)

(73) Assignee: F-Secure Corporation, Helsinki (FI)

( * ) Notice: Subject to any disclaimer, the term of this patent is extended or adjusted under 35 U.S.C. 154(b) by 13 days.

(21) Appl. No.: 14/022,455

(22) Filed: Sep. 10, 2013

(65) Prior Publication Data

US 2014/0090055 A1 Mar. 27, 2014

(30) Foreign Application Priority Data

Sep. 27, 2012 (GB) .................................. 1217275.5

(51) Int. Cl.
*H04L 29/06* (2006.01)
(52) U.S. Cl.
CPC ........... *H04L 63/145* (2013.01); *H04L 63/0245* (2013.01)
(58) Field of Classification Search
None
See application file for complete search history.

(56) References Cited

U.S. PATENT DOCUMENTS

| 7,908,658 | B1 | | 3/2011 | Oeij |
| 8,683,052 | B1* | | 3/2014 | Brinskelle ..................... 709/228 |
| 2005/0050222 | A1 | | 3/2005 | Packer |
| 2006/0195701 | A1 | | 8/2006 | Dew et al. |
| 2008/0028442 | A1 | | 1/2008 | Kaza et al. |
| 2008/0172412 | A1* | | 7/2008 | Gruhl et al. ................ 707/104.1 |
| 2009/0158430 | A1* | | 6/2009 | Borders .......................... 726/23 |
| 2011/0258326 | A1* | | 10/2011 | Hu et al. ....................... 709/226 |

FOREIGN PATENT DOCUMENTS

JP 2000029799 A 1/2000

* cited by examiner

*Primary Examiner* — David Le
(74) *Attorney, Agent, or Firm* — Harrington & Smith (57) ABSTRACT

This document discloses a solution for automatically detecting malicious content by computer security routine executed in a processing device. A user input to a social media application is detected by the computer security routine. The user input indicates that a user wants to share content with at least one other user through the social media application. In response, the computer security routine suspends said sharing and performs, before determining whether or not to allow the sharing, a security check for suspiciousness of contents the user intends to share.

21 Claims, 5 Drawing Sheets

AUTOMATED DETECTION OF HARMFUL CONTENT

FIELD

The invention relates to the field of computer security and, particularly, to detecting automatically harmful content in a user's computer.

BACKGROUND

Computer security plays a significant role in both home and office environment, since almost all computers are nowadays connected to communication networks, e.g. the Internet, in which malicious content is constantly spreading. Computer security software operates on a computer and detects such malicious content and protects the user and the computer from the malicious content.

BRIEF DESCRIPTION

According to an aspect of the invention, there is provided a method for automatically detecting malicious content by computer security routine executed in a processing device, the method comprising: detecting, in the processing device, a user input to a social media application, wherein the user input indicates that a user wants to share content with at least one other user through the social media application; suspending said sharing and performing, by the processing device before determining whether or not to allow the sharing, a security check for suspiciousness of contents the user intends to share.

According to another aspect of the invention, there is provided an apparatus comprising: at least one processor; and at least one memory including a computer program code, wherein the at least one memory and the computer program code are configured, with the at least one processor, to cause the apparatus to: execute a computer security routine; detect a user input to a social media application, wherein the user input indicates that a user wants to share content with at least one other user through the social media application; suspend said sharing and perform, before determining whether or not to allow the sharing, a security check for suspiciousness of contents the user intends to share.

According to another aspect of the invention, there is provided a computer program product embodied on a non-transitory distribution medium readable by a computer and comprising program instructions which, when loaded into an apparatus, execute a computer process comprising: detecting a user input to a social media application, wherein the user input indicates that a user wants to share content with at least one other user through the social media application; suspending said sharing and performing, before determining whether or not to allow the sharing, a security check for suspiciousness of contents the user intends to share.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figures 1, 2:
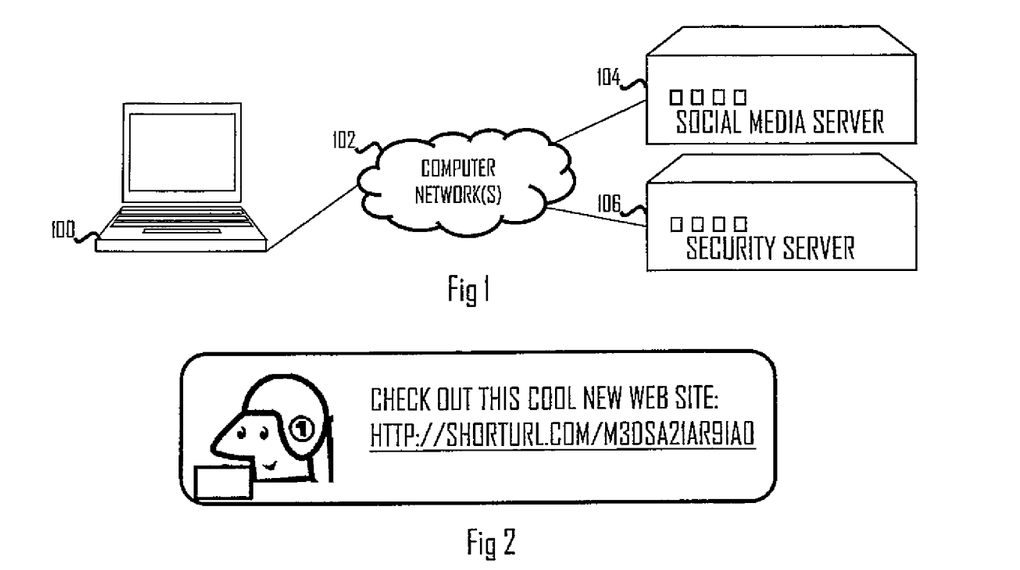
FIG. 1 illustrates a computing environment to which embodiment of the invention may be applied.
FIG. 2 illustrates an example of sharing content in a social media application.

FIG. 1 illustrates a computing environment to which embodiments of the invention may be applied. Referring to FIG. 1, the computing environment comprises a personal computing device 100 a user uses to access the Internet or, in general, servers connected by one or more computer networks 102. The personal computing device 100 may be a personal computer, a desktop computer, a laptop, or a tablet computer. The personal computing device 100 may comprise a processing system comprising at least one processor and at least one memory storing a computer program code controlling the operation of the at least one processor. The user may use the personal computing device 100 to access a social media server 104 connected to the computer network(s) 102 comprising the Internet. The social media server 104 may be configured to provide a web-based social media application. The social media application may be a social messaging application or a social media publication application, e.g. any one of the following: an e-mail application, an instant message application, a web-based discussion forum application, and a social status update publication application. An example of the instant message application is Microsoft Windows Live Messenger, and examples of the social status update publication applications include Twitter, Facebook, Google+, a blogger application, MySpace, and LinkedIn. The social status update publication application may be defined as an application the user uses to publish contents, so it may be understood as a connectionless application in which the contents are not addressed to any specific recipient.

The personal computing device 100 may comprise a security software application connected to an operating system of the personal computing device. The security software application may comprise antivirus software, a firewall, a network traffic monitoring and security application, etc. that monitor the operation of the personal computing system and attempt to detect any viruses or malicious software (malware) attempting to exploit vulnerabilities and/or cause harm in the personal computing device 100 and in communication protocols used for accessing the computer networks 102 and the social media server 104. The security software application may be connected to a security server 106 at least intermittently to check for the latest virus, worm, and malware definitions and configurations. The security software application may be a self-sustained application able to detect and quarantine any viruses, attack vectors, and malware autonomously, or it may contact the security server for instructions or virus/malware definitions upon detecting suspicious content or a possible attack vector. The attack vector may be defined as a path or means by which a hacker (or cracker) attempts to gain access to the personal computing system or to a network server in order to deliver a payload or malicious outcome. Attack vectors enable hackers to exploit system vulnerabilities, including the human element. The attack vector may carry a payload comprising a virus, a malicious web page, a pop-up window, or any other malicious or inconvenient content.

Popular social media applications may be used for sharing information or topics the user finds interesting, e.g. news, reviews, advertisements, sales, marketplaces, and events. The sharing may be realized by posting a short recommendation of the topic and a link to a corresponding web site or, in general, to an uniform resource locator (URL) storing the web site. The link is seen by followers or friends of the poster and is probably clicked by at least some of the people reading the post. This is an especially common behaviour in Twitter and Facebook. Some social media applications set a character limit to posts, e.g. 160 characters in Twitter, which is often insufficient to convey enough information, particularly in connection with long URLs. Therefore, users of Twitter typically employ URL-shortening services to shorten the links to allow some additional content to be expressed in the 160 character tweet. The sharing of URLs, with or without the shortening, is a possible attack vector for malware. This is particularly dangerous since members of social networks are more likely to trust content posted by people in their friends circle. The use of URL-shortening services prevents even a careful user from examining the actual linked URL for suspiciousness.

FIG. 2 illustrates an example of a post to a Twitter or Facebook. The post may comprise a few words typed by the user recommending a web site and a link to the web site itself. Since web URLs are often fairly long or complex, as shown by the link in FIG. 2, it is very typical for a user to copy-paste URLs to their posts in social networks in order to avoid mistyping the URL. One possible malicious attack vector is a piece of software that is able to modify a copy-paste buffer of the personal computing device 100 such that the user pastes a maliciously crafted URL instead of the one he or she was meaning to paste. The copy-paste buffer is commonly called a clipboard of the personal computing device 100. Since users may not actively check what they paste, e.g. due to the complexity of URLs or due to the fact that they have been shortened, this attack vector has the potential for a success.

An increasing number of sites include a share button for common social networks such as Twitter and Facebook. Clicking on such a button will allow the user to easily share a link to the associated content. This mechanism takes advantage of the user's current session status with the associated social networks. The share button may have been corrupted by a malware which may directly comprise malicious payload, redirect the user to a malicious web site, or insert into the shared content a link to a malicious web site. As a consequence, a redirection related to the social media application caused by the user clicking the share button on a web site also forms a possible attack vector for the malware.

A malware attack is not the only use case addressed herein. In fact, even when the content is not malicious, it may be of an inappropriate nature for that user to share with their connections within the social network. For example, a user may want to be protected against accidentally sharing links to content of criminal, violent, religiously or politically inappropriate, and/or adult nature with his/her connections in the social network.

Figure 3:
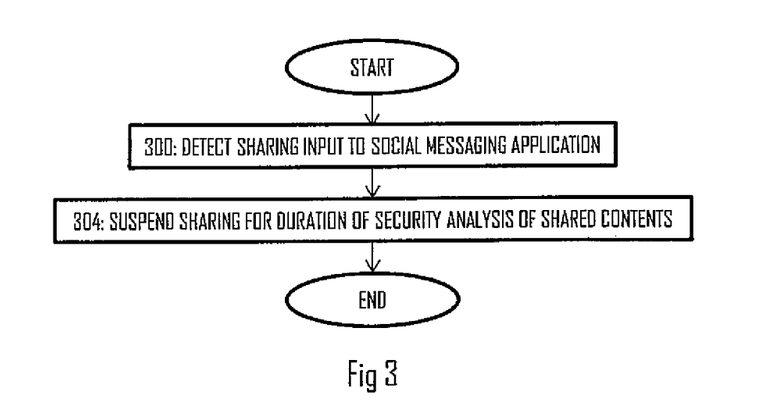
FIG. 3 is a flow diagram of a procedure for preventing sharing of suspicious content according to an embodiment of the invention.

FIG. 3 illustrates an embodiment of a method for automatically detecting malicious content by a computer security routine. The computer security routine may be defined by a computer program code stored in a memory unit of the personal computing device 100, and it may configure at least one processor of the personal computing device 100 to monitor the operation of the personal computing device 100 and, particularly, contents behind any URLs the user indicates that he/she wishes to share. Referring to FIG. 3, a user input to a social media application is detected in block 300. The user input indicates that the user wants to share content with at least one other user through the social media application. The computer security routine may scan for any contents related to the sharing operation, e.g. whether or not the sharing operation comprises an URL. In block 304, said sharing is suspended a security check for suspiciousness of the contents the user intends to share is carried out before determining whether or not to allow the sharing.

This procedure may be used to prevent the sharing of the malicious contents in the social media application and/or preventing the personal computing device 100 from accessing a malicious URL in connection with the sharing operation. Accordingly, security and user experience are improved.

In an embodiment, the security check comprises scanning for an URL within the contents to be shared, and the security check may be applied to the URL in order to detect harmful payload or suspicious web site associated with the URL.

As described above, the user may share the content in different ways. One is inputting the shared content into a text field of the social media application, e.g. into a body of an e-mail message or an instant message or into a text field of the social status update publication application such as the Twitter or Facebook. Another example is clicking the share button on a web site which calls for the corresponding social media application and triggers automated filling of the text field. At this instance, clicking the share button may cause a redirection from one web site to the social media application and, additionally, input of the content to be shared. Thus, the share button is distinguished from a conventional web link which triggers only the redirection.

Figure 4:
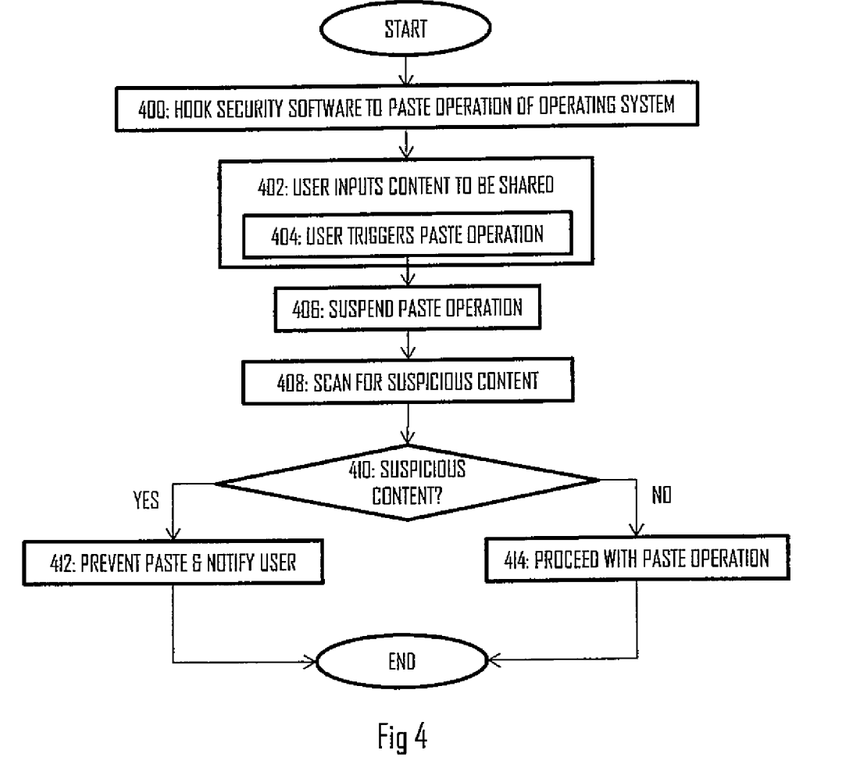
FIG. 4 is a flow diagram of an embodiment for preventing a user from entering suspicious content into a text field of the social media application.

FIG. 4 illustrates an embodiment applicable to a use case where the user manually adds the shared contents into the text field of the social media application. In this embodiment, the computer security routine may search the shared contents for any URLs added by the user to the text field or for a malicious payload accidentally being added by the user. The search may be carried out in a discreet manner such that the security program does not scan directly the contents inside the text field, as will become obvious from the following description. Therefore, the user privacy will not be affected. Referring to FIG. 4, the computer security routine is hooked to a paste operation of the operating system of the personal computing device 100 during an installation phase (block 400). The hooking may be considered as linking the operation of the computer security routine to the paste operation such that whenever the paste operation is triggered, the computer security routine executes a security routine. Let us consider this operation with reference to FIG. 4.

In block 402, the user inputs content to be shared into a text field of the social media application by using the personal computing device 100. The inputted contents comprise a link that the user pastes by using the paste operation of the operating system of the personal computing device 100 (block 404). When the paste operation is triggered, e.g. upon the operating system detects the user input of the paste operation, the paste operation is suspended (block 406) before the contents are pasted into the text field of the social media application.

Upon suspending the paste operation, the computer security routine applies a scanning operation to the contents of the clipboard to be pasted. In some embodiments, the scanning operation is applied to all contents of the clipboard. As known in the art, the paste operation itself defines certain contents of the clipboard, e.g. contents of at least one copy operation used for entering the contents into the clipboard. Such contents of the clipboard defined by the paste operation, e.g. a paste or paste all operation, are then scanned for an URL and/or malicious payload, e.g. an exploiting computer program code. Upon detecting the URL, the URL is checked for suspicious contents (block 408). Block 408 may comprise checking whether or not the URL itself contains a malicious payload, whether or not the URL refers to a malicious site, and/or whether or not the URL refers to a site which comprises non-malicious but inappropriate contents for sharing, e.g. contents that are under parental control. The scanning may comprise referring to a database storing definitions for suspicious URL:s. The database may be stored internally in the personal computing device or in the security server 106 accessed over the computer networks 102. With respect to the scanning for the malicious payload, block 408 may comprise scanning the clipboard for the malicious payload. At least the pasted contents may be searched for the malicious payload but, in some embodiments, the whole clipboard may be scanned for the malicious payload. If suspicious contents are detected in the URL and/or in the clipboard in block 410, the paste operation is cancelled in block 412 and the user is notified via a user interface of the personal computing device 100. On the other hand, if no suspicious contents are detected in block 410, the computer security routine may notify the operating system to proceed with the paste operation (block 414), and the contents are pasted into the text field of the social media application.

It should be appreciated that while the procedure of FIG. 4 is hooked to the paste operation, a similar procedure may be applied directly to a copy operation in which the user inserts selected contents to the clipboard. Hooking the security check to the paste operation may in some cases be preferred over the copy operation, as the user actually enters the contents for sharing in the paste operation. In yet another embodiment, the security check may be applied to any input the user inserts into the social media application, e.g. by typing manually.

Figure 5:
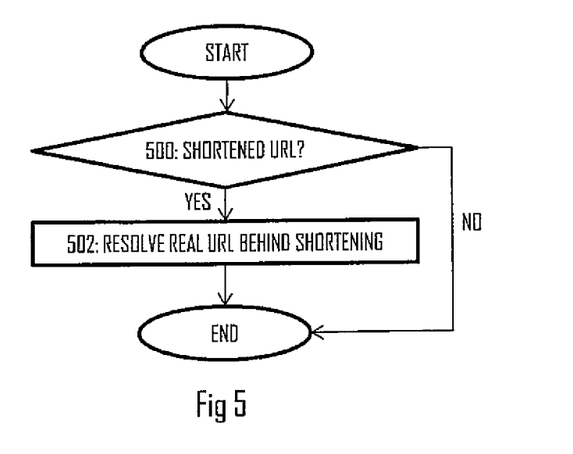
FIG. 5 illustrates a procedure for use in processing shortened uniform resource locators.

FIG. 5 illustrates an embodiment which addresses the situation where the user uses the URL shortening in the shared URL. The procedure of FIG. 5 resolves the real URL behind the shortened URL, and the procedure may be carried out before block 304 of FIG. 3 and/or in connection with FIG. 4, e.g. between blocks 406 and 408 after detecting the URL in the contents being pasted. Upon detecting the URL in the contents to be shared, it is determined whether or not the URL is shortened (block 500 in FIG. 5). The shortening may be detected from the URL, e.g. from a domain name of the URL. If the domain name refers to a site of a known URL shortening service, it may be determined that the URL has been shortened. If the URL is detected as a real URL not containing the shortening in block 500, the URL-resolving sub-routine ends. On the other hand, if the shortening is detected in block 500, the procedure starts resolving the real URL behind the shortened URL (block 502). Block 502 may comprise first checking that the shortened URL does not comprise any malicious payload and, upon discovering no malicious payload, accessing the URL to derive the real URL to which the shortened URL redirects. Thereafter, the procedure returns for reputation analysis that is applied to the real URL.

In an embodiment, the same or similar reputation analysis may be applied to the shortened URL before block 502 in order to determine whether the shortened URL itself refers to a suspicious site or suspicious content.

Figure 6:
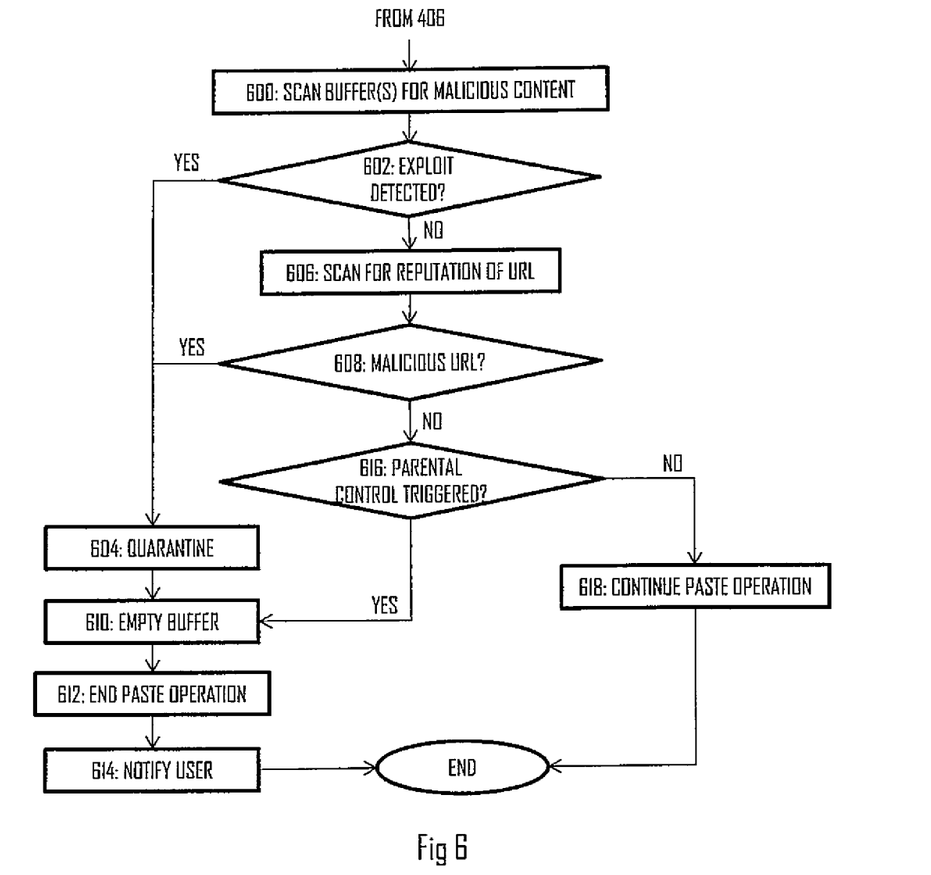
FIG. 6 is a flow diagram of detailed operation in connection with the process of FIG. 4 according to an embodiment of the invention.

FIG. 6 illustrates a detailed embodiment of blocks 408 to 414 of FIG. 4. The procedure of FIG. 4 comprises several types of security checks that may be applied to the detected URL, and it should be appreciated that this embodiment of the invention is not limited to this specific combination of the security checks but that it encompasses embodiments where only a subset of the security checks of FIG. 4 are performed. Referring to FIG. 6, upon suspending the paste (or copy) operation, the computer security routine may first scan the clipboard for malicious content, e.g. an exploit (block 600). The exploit may be defined in this context as a computer program code representing a direct attack towards the personal computing system 100. Block 600 may comprise carrying out an anti-virus check or an anti-malware check for the clipboard and/or the working memory (e.g. a random access memory) of the personal computing device 100. If the exploit is detected (block 602), the process proceeds to block 604 in which the exploit is quarantined by using state-of-the-art quarantine methods, and the contents of the clipboard are deleted in order to prevent another attack (block 610). The paste operation may be cancelled (block 612) and the user may be notified of the detection of the exploit (block 614) via the user interface. On the other hand, if no exploit has been detected in the URL or in the contents of the clipboard, the URL may be determined as a real reference to a resource location, and the process proceeds to block 606 in which the reputation of the URL is checked. The check may be based on the above-mentioned reputation database. If the check results in determining that the URL refers to a malicious site, e.g. to a site known to contain malicious contents, the process may proceed to block 604 in which reference to the URL is quarantined and the paste operation is cancelled. On the other hand, if the URL is determined to refer to a site not known to contain malicious content, the nature of the site may be determined in block 616. The same reputation database may comprise classifications of known sites according to their contents, and the classification of the URL may be compared with the user's parental profile currently in use. If the comparison results in that the parental control is triggered meaning that the URL refers to a site that should be blocked according to the parental profile, the process proceeds to block 610 in which the sharing is prevented. On the other hand, if the classification of the URL shows that the contents of the URL are appropriate in view of the parental profile, the process proceeds to block 618 in which the paste operation is allowed to continue.

It should be appreciated that the order of the checks in blocks 602, 608, 616 may differ in other embodiments, e.g. the parental control may be applied before checking for the maliciousness of the site referred by the URL in block 608. It should also be appreciated that if the URL has been shortened, the procedure of FIG. 5 may be carried out before block 606, or the procedure may first be carried out for the shortened URL and, if no malicious or inappropriate contents are detected, the shortened URL may be resolved and the same procedure may be applied to the real URL.

Another embodiment of the invention addresses the attack vectors related to the share buttons on the web pages. The share button has the redirection functionality in addition to the content sharing functionality, wherein the redirection redirects an Internet browser from one site to another, e.g. the redirection may call or access the social media application installed in the personal computing device 100 or a web site of the social media application. In one attack scenario, the share button itself may contain a properly formatted redirection to the social network site in question, but the contents of the shared link may point to a malicious or inappropriate site. This attack would cause the user to inadvertently share a malicious or otherwise unwanted link in his/her social network. A second attack vector arises when the redirection does not point to where the user expects (the social network site) but to another site. This sort of attack might be used to either point directly to a site serving a malicious exploit or to point to a site that looks exactly like the social network the user was expecting to visit. The latter may be used to fish for the user's credentials. The third attack vector is one in which the share button itself contains a malicious payload, such as a direct exploit to the user's system.

Figure 7:
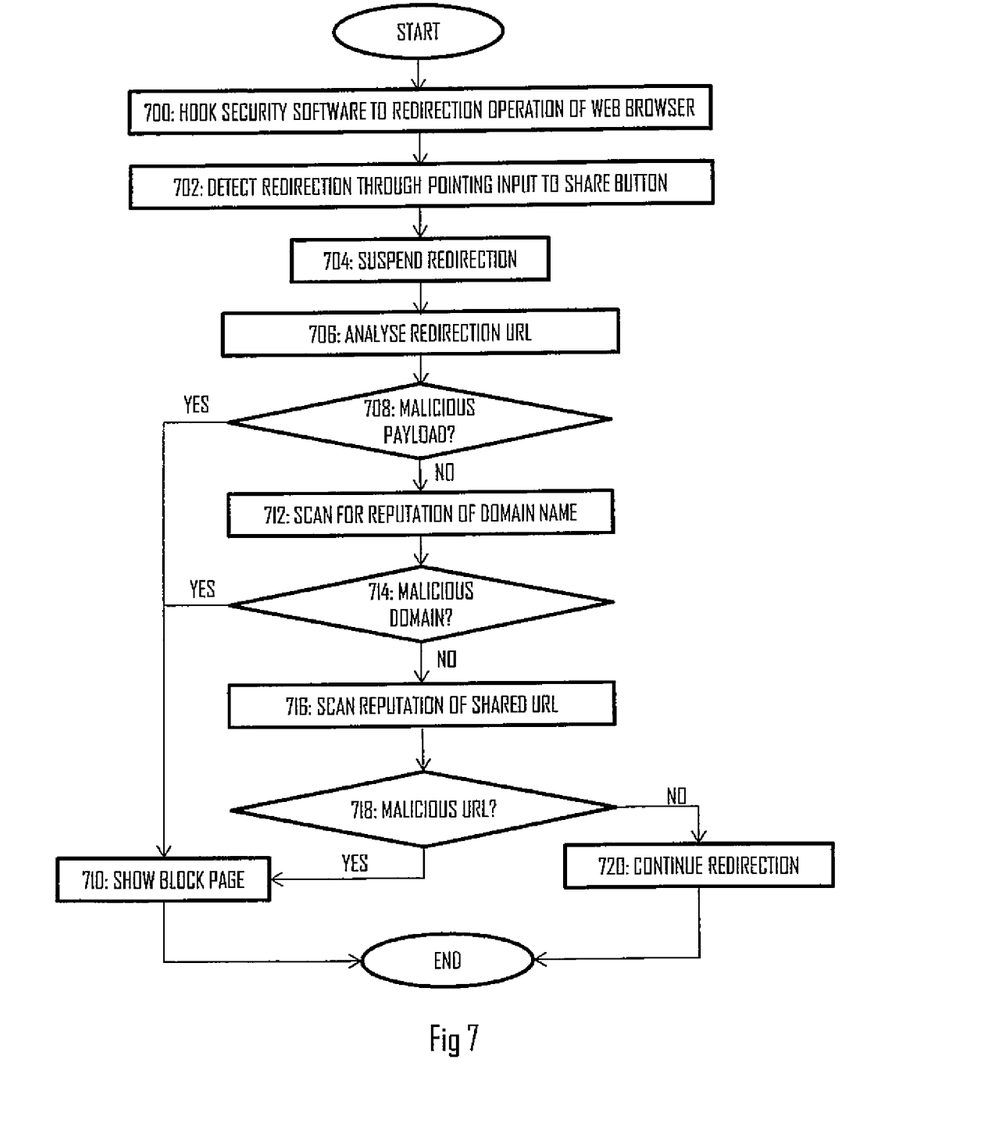
FIG. 7 is a flow diagram of an embodiment for preventing a user from accessing and/or advertising suspicious content in relation with automated sharing functionality triggered by a pointing input indicating a share button of the social media application.

FIG. 7 illustrates an embodiment of a procedure that may be used to address these attack vectors. The process of FIG. 7 prevents the user from accessing and/or advertising suspicious content in relation with an automated sharing functionality triggered by a pointing input indicating a share button of the social media application. Referring to FIG. 7, the computer security software installed to the personal computing device may be hooked to the redirection operation of the internet browser(s) installed to the personal computing device 100 (block 700). In particular, the computer security software may be hooked to the redirections comprised in the share buttons. In block 702, a user input indicating that the user points (or clicks) the share button is detected. The detection may trigger the redirection to the social messaging site or application to share at least some of the contents of the web site on which the share button was clicked. In response to triggering the sharing redirection, the redirection is suspended and the computer security software is called to carry out the security check for the redirection (block 704). In block 706, the computer security software analyses URLs related to the redirection. Block 706 may comprise analysing the URL to which the redirection directs the user. In block 708, it is determined whether or not the redirecting URL contains a malicious payload. This may be carried out by scanning at least one buffer storing data after the redirection was triggered with an anti-virus and/or anti-malware engine. This counters the third attack vector described above. If the buffer is detected to contain malicious payload, the malicious payload is quarantined or deleted, and the process proceed to block 710 in which the redirection is cancelled. The user may be informed about the cancellation of the sharing by showing on a display of the personal computing device 100 that the sharing has been blocked because of malicious contents related to the sharing. On the other hand, if no malicious content is detected in the buffer(s), the process proceeds to block 712.

In block 712, the reputation of the redirecting URL, e.g. the reputation of the domain name of the redirecting URL, is checked in order to determine whether the redirecting URL points to the site to which the user expects to visit or to a malicious site. This addresses the above-described second attack vector. The reputation check of block 712 may be carried out by referring to the database storing the definitions for malicious or suspicious web sites. If the domain of the redirecting URL is found to be suspicious or even malicious (block 714), the redirection is cancelled and the process proceeds to block 710. On the other hand, if the reputation status of the redirecting URL is not found to be suspicious, the process proceeds to block 716.

In block 716, the reputation check is applied to the URL comprised as payload in the content to be shared by clicking the share button, provided that the URL has been detected in the shared contents. The content to be shared may comprise a summary of the web site on which the user clicked the share button and, additionally, an URL to the web site or to another web site, e.g. a third web site. Block 716 may comprise analysing the reputation of the domain name of the URL being shared. The reputation check may be carried out by referring to the database, as described above. If the URL is found to be suspicious, the redirection may be cancelled and the process may proceed to block 710. If the URL advertised in the shared contents is found to have good reputation, the redirection may be continued in block 720.

It should be appreciated that the parental control of block 616 may be applied to this embodiment as well, e.g. between blocks 718 and 720. Equally, the URL resolving upon detecting a shortened URL according to FIG. 5 may be used in connection with the redirecting URL and/or the shared URL.

The processes or methods described in connection with FIGS. 3 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Figure 8:
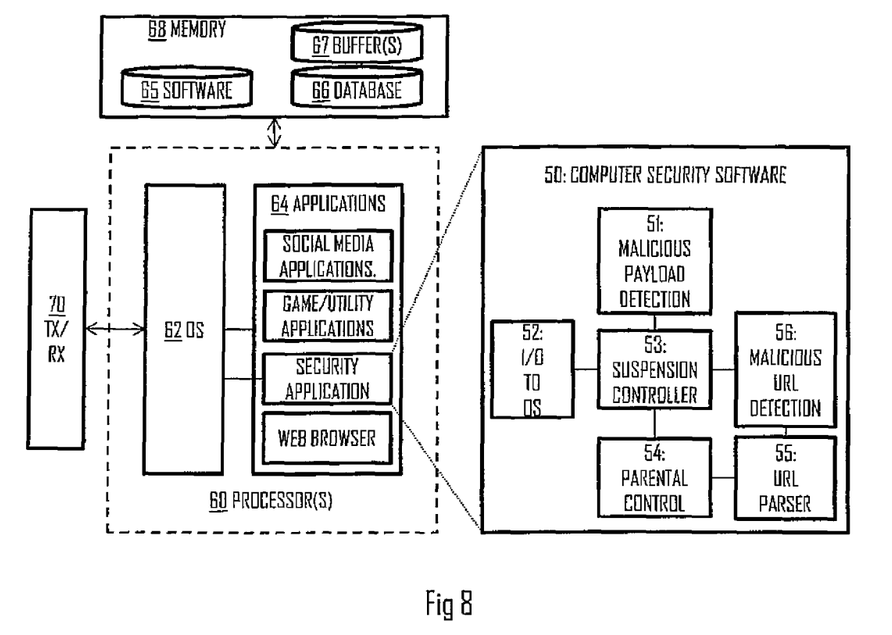
FIG. 8 is a block diagram of a structure of an apparatus according to an embodiment of the invention.

Above, embodiments of methods for automatically preventing the user from sharing a suspicious URL and/or accessing a suspicious URL in connection with content sharing are described. FIG. 8 illustrates a block diagram of an embodiment of an apparatus for carrying out the embodiments. The apparatus may be comprised in the personal computing device 100, and the apparatus may comprise a processing system configured or arranged to carry out computer security functions. The processing system may comprise at least one processor 60 and at least one memory 68 including a computer program code 65, wherein the at least one memory 68 and the computer program code 65 are configured, with the at least one processor 60, to cause the apparatus to carry out the above-described embodiments.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/ or a field-programmable grid array (FPGA) circuit for the apparatus according to an embodiment of the invention.

Referring to FIG. 8, the processor 60 may be configured to execute an operating system (OS) 62 of the personal computing device 100. The operating system may be an arbitrary operating system, e.g. Microsoft Windows, Mac OS, iOS, Linux, Unix, Berkeley Software Distribution (BSD), Google Chrome, Android, MeeGo, Symbian, Blackberry OS, etc. As known in the art, the operating system 62 manages computer hardware resources, e.g. the processor(s) 60 and provides services to applications 64 executed in the personal computing device 100. The applications 64 may comprise any known computer program applications including at least the above-mentioned social media application and the computer security applications. Additionally, the applications 64 may comprise game and/or utility applications, office applications, professional applications related to any professional field, a web browser, etc. The apparatus may further comprise or be connected to a communication interface 70 comprising hardware and/or software for realizing a communication connectivity according to one or more communication protocols. The operating system 62 may configure the communication interface 70 to provide a connection to the computer networks 102, e.g. the Internet. The communication interface 70 under the control of the operating system may be used to access the network servers 104, 106.

The computer security applications may comprise an antivirus engine, a firewall, a network traffic monitor, etc. for tracking any known attack vector to prevent a virus, worm, or malware from accessing the personal computing device. The computer security applications may also provide the above-described functionality of the computer security software 50 used for eliminate any attack vectors related to the sharing functionality in connection with the social media applications. Referring to FIG. 8, the computer security software may comprise an interface 52 to the operating system 62. The interface 52 may be a software interface, and it may be used to hook the computer security software to the copy/paste operation and/or browser redirection operation of the operating system 62. Upon launching any one of these operations, the operating system may call the computer security software to carry out the security check, or the computer security software 50 may monitor the operation of the operating system 62 and, upon detecting any one of the above-described operations, the computer security software may suspend the corresponding sharing operation of the operating system 62 for the duration of the security check. A suspension controller 53 comprised in the computer security software may control the suspension at least in the sense that it determines whether to allow the continuation of the suspended sharing operation or to cancel the suspended operation, as described above. The suspension controller 53 may make the decision on the basis of the various security checks mentioned above. A separate functional entity in the computer security software may handle the different security checks. A malicious payload detection module 51 may analyse the buffer(s) 67 comprised in the memory 68 for malicious payload and report the result of the analysis to the suspension controller 53. A malicious URL detection module 56 may access the reputation database 66 stored in the memory 68 or in the security server 106 to check the reputation status of the URLs related to the sharing. A parental control module 54 may check the classification of the URLs related to the sharing with respect to the parental control status. If all the modules 51, 54, 55, 56 report that no attack has been detected and that the URLs are neither suspicious nor under parental control, the suspension controller 53 may notify the operation system 62 through the interface to continue the sharing operation. Otherwise, the sharing may be prevented.

The present invention is applicable to computing systems defined above but also to other computing environments. The processors, operating systems, and software elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for automatically detecting malicious content by computer security routine executed in a processing device, the method comprising:

detecting, in the processing device, a user input to a social status update publication application, wherein the user input indicates that a user wants to share content with at least one other user through the social status update publication application;

suspending a sharing operation of the social status update publication application and performing, by the processing device before determining whether or not to allow the sharing, a security check for suspiciousness in the content the user intends to share;

upon detecting in the security check that the content the user intends to share comprises malware, cancelling the suspended sharing operation; and upon detecting no malicious content in the security check, allowing continuation of the suspended sharing operation.

2. The method of claim 1, wherein the user input is an initiation of a paste operation to enter the content to be shared from a copy-paste buffer of the processing device into a text field of the social media publication application, the method further comprising:

hooking the computer security routine to the paste operation and, upon detecting the paste operation, suspending the detected paste operation for the duration of the security check directed to the content of the paste operation.

3. The method of claim 1, wherein the user input is an initiation of a copy operation to enter the content to be shared to the copy-paste buffer of the processing device, the method further comprising:

hooking the computer security routine to the copy operation and, upon detecting the initiation of the copy operation by the user input, suspending the detected copy operation for the duration of security check directed to the content of the copy operation.

4. The method of claim 1, wherein said security check comprises:

scanning the contents the user intends to share for a uniform resource locator;

upon detecting the uniform resource locator within the contents, checking a reputation status of the uniform resource locator.

5. The method of claim 1, wherein the user input launches a redirection command to redirect from a first uniform resource location to a second uniform resource location, the method further comprising:
   identifying the redirection as a redirection to share at least some of the contents of the first uniform resource location;
   suspending the redirection upon detecting the user input and applying the security check to at least one uniform resource locator related to the redirection.

6. The method of claim 5, wherein the redirection input is a pointing input of a share button related to the social media publication application.

7. The method of claim 5, wherein said security check comprises checking a reputation status of the second uniform resource location comprised in the redirection command and/or a uniform resource locator comprised in the contents of the first uniform resource location that are to be shared.

8. The method of claim 1, further comprising:
   detecting a uniform resource locator within the contents to be shared;
   detecting that the uniform resource locator is a shortened uniform resource locator;
   resolving a real uniform resource locator behind the shortened uniform resource locator; and
   applying said security check to the real uniform resource locator.

9. The method of claim 1, wherein said security check comprises:
   determining whether or not the contents to be shared comprises at least one of the following harmful contents: malicious payload creating a security risk for the processing device, a link to a web site known to contain suspicious contents, and information that is under a parental control of the processing device; and
   upon determining that the contents to be shared comprises at least one of said harmful contents, taking a precautionary action to prevent an effect of said harmful contents.

10. The method of claim 1, wherein said security check comprises:
    providing a reputation database comprising a plurality of categories for different types of contents, wherein some of the categories define contents that are allowed for sharing and some of the categories define contents that are not allowed for sharing;
    determining a category of the contents to be shared; and
    upon determining that the contents to be shared belongs to a category for which sharing is not allowed, preventing said sharing.

11. An apparatus comprising:
    at least one processor; and
    at least one non-transitory memory including a computer program code, wherein the at least one non-transitory memory and the computer program code are configured, with the at least one processor, to cause the apparatus to:
    execute a computer security routine;
    detect a user input to a social status update publication application, wherein the user input indicates that a user wants to share content with at least one other user through the social status update publication application;
    suspend a sharing operation of the social status update publication application and perform, before determining whether or not to allow the sharing, a security check for suspiciousness in the content the user intends to share;
    upon detecting in the security check that the content the user intends to share comprises malware, cancel the suspended sharing operation; and
    upon detecting no malicious content in the security check, allow continuation of the suspended sharing operation.

12. The apparatus of claim 11, wherein the user input is an initiation of a paste operation to enter the content to be shared from a copy-paste buffer of the processing device into a text field of the social media publication application, and wherein the at least one non-transitory memory and the computer program code are configured, with the at least one processor, to cause the apparatus to hook the computer security routine to the paste operation and, upon detecting the paste operation, suspending the detected paste operation for the duration of the security check directed to the content of the paste operation.

13. The apparatus of claim 11, wherein the user input is an initiation of a copy operation to enter the content to be shared to the copy-paste buffer of the processing device, and wherein the at least one non-transitory memory and the computer program code are configured, with the at least one processor, to cause the apparatus to hook the computer security routine to the copy operation and, upon detecting the initiation of the copy operation by the user input, suspending the detected copy operation for the duration of security check directed to the content of the copy operation.

14. The apparatus of claim 11, wherein the at least one non-transitory memory and the computer program code are configured, with the at least one processor, to cause the apparatus to:
    scan, during the security check, the contents the user intends to share for a uniform resource locator;
    upon detecting the uniform resource locator within the contents, check a reputation status of the uniform resource locator.

15. The apparatus of claim 11, wherein the user input launches a redirection command to redirect from a first uniform resource location to a second uniform resource location, and wherein the at least one non-transitory memory and the computer program code are configured, with the at least one processor, to cause the apparatus to:
    identify the redirection as a redirection to share at least some of the contents of the first uniform resource location;
    suspend the redirection upon detecting the user input and apply the security check to at least one uniform resource locator related to the redirection.

16. The apparatus of claim 15, wherein the redirection input is a pointing input of a share button related to the social media publication application.

17. The apparatus of claim 15, wherein the at least one non-transitory memory and the computer program code are configured, with the at least one processor, to cause the apparatus to check, during the security check, a reputation status of the second uniform resource location comprised in the redirection command and/or a uniform resource locator comprised in the contents of the first uniform resource location that are to be shared.

18. The apparatus of claim 11, wherein the at least one non-transitory memory and the computer program code are configured, with the at least one processor, to cause the apparatus to:
    detect a uniform resource locator within the contents to be shared;
    detect that the uniform resource locator is a shortened uniform resource locator;

resolve a real uniform resource locator behind the shortened uniform resource locator; and
apply said security check to the real uniform resource locator.

19. The apparatus of claim 11, wherein the at least one non-transitory memory and the computer program code are configured, with the at least one processor, to cause the apparatus to:
determining, during the security check, whether or not the contents to be shared comprises at least one of the following harmful contents: malicious payload creating a security risk for the processing device, a link to a web site known to contain suspicious contents, and information that is under a parental control of the processing device; and
upon determining that the contents to be shared comprises at least one of said harmful contents, take a precautionary action to prevent an effect of said harmful contents.

20. The apparatus of claim 11, wherein the at least one non-transitory memory and the computer program code are configured, with the at least one processor, to cause the apparatus to:
utilize a reputation database comprising a plurality of categories for different types of contents, wherein some of the categories define contents that are allowed for sharing and some of the categories define contents that are not allowed for sharing;
determine a category of the contents to be shared; and
upon determining that the contents to be shared belongs to a category for which sharing is not allowed, prevent said sharing.

21. A computer program product embodied on a non-transitory distribution medium readable by a computer and comprising program instructions which, when loaded into an apparatus, execute a computer process comprising:
detecting a user input to a social status update publication application, wherein the user input indicates that a user wants to share content with at least one other user through the social status update publication application;
suspending a sharing operation of the social status update publication application and performing, before determining whether or not to allow the sharing, a security check for suspiciousness in the content the user intends to share;
upon detecting in the security check that the content the user intends to share comprises malware, cancelling the suspended sharing operation; and
upon detecting no malicious content in the security check, allowing continuation of the suspended sharing operation.

* * * * *